United States Patent
Yamazaki

(10) Patent No.: US 7,990,598 B2
(45) Date of Patent: Aug. 2, 2011

(54) SCAN-TYPE IMAGE DISPLAY DEVICE

(75) Inventor: Tetsuro Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 403 days.

(21) Appl. No.: 12/144,067

(22) Filed: Jun. 23, 2008

(65) Prior Publication Data

US 2009/0009832 A1 Jan. 8, 2009

(30) Foreign Application Priority Data

Jul. 6, 2007 (JP) ................................. 2007-178297

(51) Int. Cl.
*G02B 26/08* (2006.01)
(52) U.S. Cl. ..................................................... 359/202.1
(58) Field of Classification Search ............... 359/202.1, 359/212.1, 213.1, 214.1, 223.1, 224.1, 226.1
See application file for complete search history.

(56) References Cited

U.S. PATENT DOCUMENTS

| | | | |
|---|---|---|---|
| 6,310,662 B1 | 10/2001 | Sunakawa et al. | |
| 7,256,917 B2 | 8/2007 | Ishihara | |
| 7,262,894 B2 * | 8/2007 | Oettinger et al. | .......... 359/213.1 |
| 7,492,495 B2 | 2/2009 | Ishihara et al. | |

FOREIGN PATENT DOCUMENTS

| | | |
|---|---|---|
| JP | 01-245780 | 9/1989 |
| JP | 08-009309 A | 1/1996 |
| JP | 2003-149577 A | 5/2003 |
| JP | 2003-186112 A | 7/2003 |
| JP | 2005-157111 A | 6/2005 |
| JP | 2005-292371 A | 10/2005 |
| JP | 2007-199251 A | 8/2007 |
| WO | WO-2007-001680 | 1/2007 |

* cited by examiner

*Primary Examiner* — Euncha P Cherry
(74) *Attorney, Agent, or Firm* — AdvantEdge Law Group, LLC

(57) ABSTRACT

A scan-type image display device which displays an image by scan of laser beam emitted from a light source in one direction and another direction of a light receiving surface includes: a first scan unit which performs scan of the laser beam in the one direction by deflecting the laser beam; a second scan unit which performs scan of the laser beam in the another direction by deflecting the laser beam; and a scan control unit which equalizes the scan width of the laser beam scan in the one direction by using the first scan unit performed at each position in the another direction within the light receiving surface.

5 Claims, 6 Drawing Sheets

SCAN-TYPE IMAGE DISPLAY DEVICE

BACKGROUND

1. Technical Field

The present invention relates to a scan-type image display device.

2. Related Art

Recently, a scan-type image display device which displays images by performing raster scan on a light receiving surface using laser beams or other lights has been proposed. According to this scan-type image display device, two-dimensional light scan needs to be carried out by using a scanner including polygon-mirror, galvano-mirror, or the like for producing images. For the two-dimensional light scan, the scan direction of one scanner is both of horizontal and vertical directions, for example. In this case, however, the structure and control of the scanning system is complicated. For overcoming this drawback, a scan-type image display device having a pair of scanners each of which performs one-dimensional light scan has been proposed (see JP-A-1-245780). According to this scan-type image display device having the pair of the scanners, one of the scanners scans in the horizontal direction, and the other scans in the vertical direction. Light emitted from a light source passes through the scanner for horizontal scanning, and then passes through the scanner for vertical direction to travel toward the screen surface.

According to the structure using the scanner for horizontal scan and the scanner for vertical scan, however, the scan area scanned by the pair of the scanners becomes bobbin-shaped on the screen surface. This is because the optical path length from the horizontal scanner to the screen surface increases toward the upper and lower ends of the screen surface.

For converting the scan area on the screen into an appropriate rectangular area, it is possible to provide a correcting optical system between the pair of the scanners and the screen surface, or to control turn-on timing of the light source, for example.

However, the following problems arise from the scan-type image display device according to the above reference. When the correcting optical system is equipped as in the former example, lens and mirror having a not rotational curved surface and large-area are needed. Because, the scan area scanned by the pair of the scanners is large. Thus, manufacture of the display device is difficult. When the turn-on timing of the light source is controlled as in the latter example, the light utilization efficiency lowers due to the presence of periods when the light source is turned off. Moreover, the turn-on timing of the light source needs to be changed for each of the lines arranged in the vertical direction. In this case, the control circuit for controlling the turn-on timing is complicated.

SUMMARY

It is an advantage of some aspects of the invention to provide a scan-type image display device capable of converting a scan area into an appropriate rectangular area by using a simple structure.

A scan-type image display device which displays an image by scan of laser beam emitted from a light source in one direction and another direction of a light receiving surface according to an aspect of the invention includes: a first scan unit which performs scan of the laser beam in the one direction by deflecting the laser beam; a second scan unit which performs scan of the laser beam in another direction by deflecting the laser beam; and a scan control unit which equalizes the scan width of the laser beam scan in the one direction by using the first scan unit performed at each position in another direction within the light receiving surface.

According to this structure, the scan area produced by the first and second scan units can be converted to a rectangular area by using a simple structure capable of performing the scan in the one direction such that the scan width can be equalized. More specifically, by the control performed such that the scan width of the scan in the one direction using the first scan unit is kept constant in the other direction as the scan direction of the second scan unit, the necessity for providing a complicated optical system, a circuit for controlling turn-on timing, or the like can be eliminated. Thus, correction of the scan area produced by the first and second scan units can be easily achieved.

Moreover, the turn-on timing of the laser beam emitted from the light source during scan in the one direction is not required to be changed for each of the points in the other direction since the scan area is converted into a rectangular area by equalizing the scan width. Thus, light utilization efficiency is higher than that in the structure including the circuit for controlling the turn-on timing.

It is preferable that, in the scan-type image display device according to the aspect of the invention, the scan control unit equalizes the scan width of the laser beam scan in the one direction with the scan width of the laser beam scan in the one direction performed at a predetermined position within the light receiving surface.

According to this structure, the scan width performed at one position within the light receiving surface is determined as a reference scan width, and the scan widths performed at other positions are equalized with the reference scan width. Thus, the scan area can be more easily corrected. It is possible, therefore, to use the highest possible scan capability of the first scan unit for the control over the scan width by performing the scan in the one direction using the highest possible scan capability for the scan in the one direction.

It is preferable that, in the scan-type image display device according to the aspect of the invention, the scan control unit equalizes the scan width of the laser beam scan in the one direction with the scan width of the laser beam scan in the one direction performed at a position at which the angle formed by the optical axis of the laser beam deflected by the first and second scan units and the normal direction of the light receiving surface becomes the minimum.

According to this structure, the scan width performed at the point at which the scan width becomes the minimum is determined as a reference scan width, and the scan widths performed at other positions are equalized with the reference scan width. Thus, the scan area can be more easily corrected. More specifically, the scan width of the laser beam scan in the one direction performed at the point at which the angle formed by the optical axis of the laser beam and the normal direction of the light receiving surface becomes the minimum is smaller than the scan width of the laser beam scan in the one direction performed at positions other than this point in the other direction of the light receiving surface. It is possible, therefore, to use the highest possible scan capability of the first scan unit for the control over the scan width by performing the scan in the one direction using the highest possible scan capability for the scan in the one direction.

It is preferable that the scan-type image display device according to the aspect of the invention includes an angle detection unit which detects the angle formed by the normal direction of the light receiving surface and the optical axis of the laser beam at the center of the scan area produced by the first and second scan units. In this case, it is preferable that the scan control unit controls the scan width of the laser beam scan in the one direction based on the detection result detected by the angle detection unit.

According to this structure, the elevation angle or depression angle as the angle formed by the optical axis of the laser beam and the light receiving surface at the center of the scan area is detected, and the scan widths of the scan using the first scan unit are equalized in the other direction based on the detection.

It is preferable that the scan-type image display device according to the aspect of the invention includes a shape detection unit which detects the shape of the scan area on the light receiving surface produced by the first and second scan units. In this case, it is preferable that the scan control unit controls the scan width of the laser beam scan in the one direction based on the detection result detected by the shape detection unit.

According to this structure, the shape of the scan area is detected, and the scan widths of the scan using the first scan unit are equalized in the other direction based on the detection.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
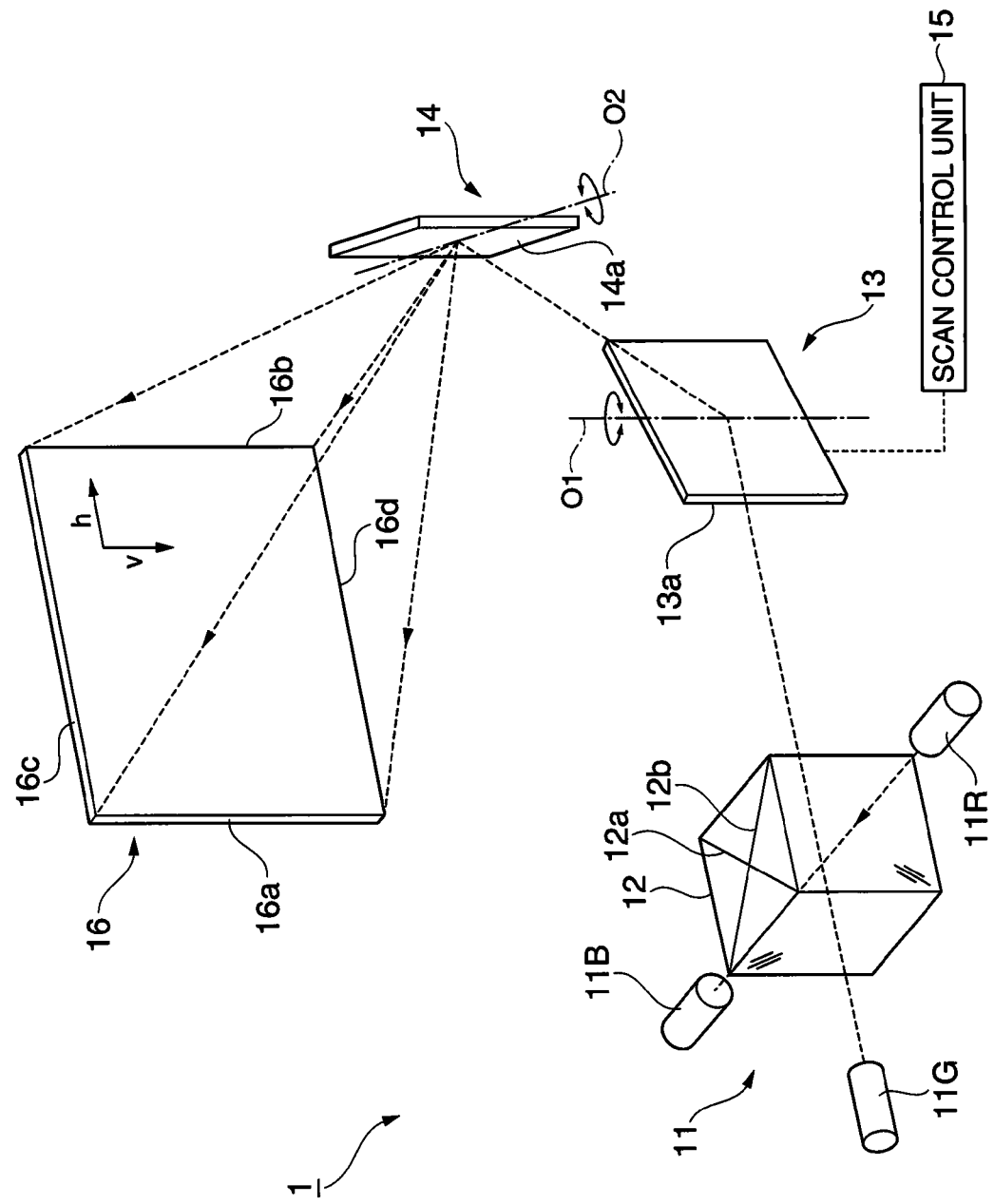
FIG. 1 illustrates a general structure of a scan-type image display device according to a first embodiment.
Figure 2:
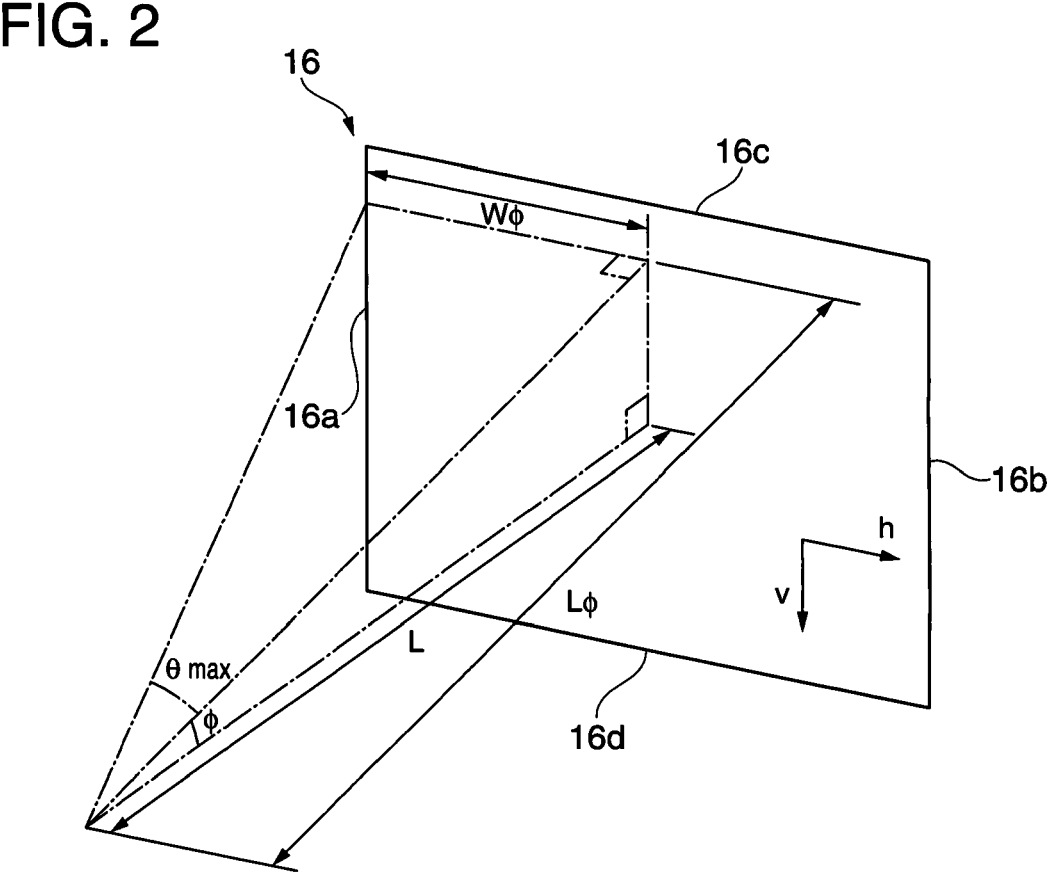
FIG. 2 illustrates a method for controlling scan width by using a scan control unit.
Figure 3:
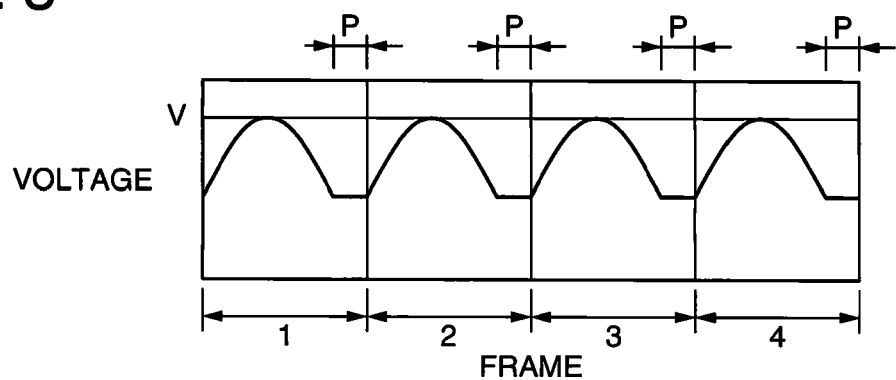
FIG. 3 is a graph showing variations in voltage supplied to an MEMS mirror.

A scan-type image display device according to a first embodiment of the invention is hereinafter described with reference to the drawings. The scales in the figures depicting this embodiment are appropriately changed for each figure so that the components shown therein can be easily recognized. FIG. 1 schematically illustrates a structure of a scan-type image display device. FIG. 2 illustrates a method for controlling scan width in the horizontal direction of a screen by using a scan control unit. FIG. 3 is a graph showing variations in voltage supplied to an MEMS mirror.

As illustrated in FIG. 1, a scan-type image display device 1 according to this embodiment includes a light source 11, a cross dichroic prism 12, an MEMS mirror (first scan unit) 13, a galvano-mirror (second scan unit) 14, and a scan control unit 15, and emits laser beam from the light source 11 toward a screen (light receiving surface) 16.

The light source 11 has a red light source 11R for emitting red laser beam (center wavelength: e.g. 620 nm), a green light source 11G for emitting green laser beam (center wavelength: e.g. 530 nm), and a blue light source 11B for emitting blue laser beam (center wavelength: e.g. 460 nm).

The cross dichroic prism 12 is constituted by affixed four rectangular prisms. A dielectric multilayer film 12a for reflecting red light and a dielectric multilayer film 12b for reflecting blue light are provided in an X shape on the boundaries of the respective rectangular prisms constituting the cross dichroic prism 12. The cross dichroic prism 12 combines laser beams in the respective colors emitted from the red light source 11R, green light source 11G, and the blue light source 11B and releases the combined light toward the MEMS mirror 13.

The MEMS mirror 13 is a scanner for horizontal scan which performs laser beam scan in a horizontal direction h of the two directions including the horizontal direction (one direction) h and a vertical direction (the other direction) v of the screen 16 by rotating a reflection surface 13a around a rotation axis O1. The MEMS mirror 13 rotates a mirror supported by a torsion spring, for example, around the rotation axis O1 by electrostatic force. According to this structure, the rotation amplitude varies in accordance with supplied voltage. The MEMS mirror 13 releases the laser beam received from the cross dichroic prism 12 toward the galvano-mirror 14. The MEMS mirror 13 is so designed as to supply laser beam deflected in a direction corresponding to a rotation axis O2 of a reflection surface 14a on the galvano-mirror 14. The rotation axis O2 and the reflection surface 14a of the galvano-mirror 14 will be described later.

The galvano-mirror 14 is a scanner for vertical scan which performs laser beam scan in the vertical direction v of the screen 16 by rotating the reflection surface 14a around the rotation axis O2. The galvano-mirror 14 releases the laser beam received from the MEMS mirror 13 toward the screen 16.

As illustrated in FIG. 1, the scan control unit 15 controls the scan width of the scan in the horizontal direction h by using the MEMS mirror 13 according to the position of the scan in the vertical direction v of the screen 16. The control method of the scan width performed by the scan control unit 15 will be described later.

The screen 16 is disposed in such a position as to receive laser beam at the center of the screen 16 when the optical deflection angles of the MEMS mirror 13 and the galvano-mirror 14 are zero degree. More specifically, the screen 16 is disposed in such a position as to receive laser beam at the middle point between a left end side 16a and a right end side 16b when the optical deflection angle of the MEMS mirror 13 is zero degree, and at the middle point between an upper end side 16c and a lower end side 16d when the optical deflection angle of the galvano-mirror 14 is zero degree. Also, the screen 16 is disposed in such a position that the optical axis of the laser beam released from the galvano-mirror 14 cross the screen 16 at right angles when the optical deflection angles of the MEMS mirror 13 and the galvano-mirror 14 are zero degree. Thus, the scan-type image display device 1 produces neither elevation angle nor depression angle with respect to the screen 16.

Image Display Method

The image display method performed by the scan-type image display device 1 having this structure is now described.

Laser beams emitted from the red light source 11R, green light source 11G, and blue light source 11B are combined by the cross dichroic prism 12, and the combined laser beam is reflected by the reflection surface 13a of the MEMS mirror 13 such that the beam can travel toward the reflection surface 14a of the galvano-mirror 14. The laser beam coming from the MEMS mirror 13 and reflected by the reflection surface 14a of the galvano-mirror 14 is applied to the screen 16.

Then, horizontal scan of the laser beam applied to the screen 16 is performed in the horizontal direction h by rotating the reflection surface 13a of the MEMS mirror 13 around the rotation axis O1 in accordance with change of voltage supplied to the MEMS mirror 13 in an appropriate manner. Also, vertical scan of the laser beam applied to the screen 16 is performed in the vertical direction v by rotating the reflection surface 14a of the galvano-mirror 14 around the rotation axis O2.

In this step, the scan control unit 15 appropriately changes the voltage supplied to the MEMS mirror 13 such that the scan width of the MEMS mirror 13 in the horizontal direction h can be equalized at each position of the screen 16 in the vertical direction v. Thus, the scan area of the screen 16 produced by the MEMS mirror 13 and the galvano-mirror 14 becomes rectangular.

The method for controlling the voltage supplied to the MEMS mirror 13 by using the scan control unit 15 is now described. As explained above, the scan-type image display device 1 produces neither elevation angle nor depression angle with respect to the screen 16.

The scan control unit 15 sets a reference point at the center point of the screen 16 at which the optical axis of the laser beam released from the galvano-mirror 14 crosses the screen 16 at right angles, that is, the point at which the angle formed by the optical axis of the laser beam released from the galvano-mirror 14 and the normal direction of the screen 16 becomes the minimum. The scan control unit 15 also sets a reference width at the scan width of laser beam scan in the horizontal direction h of the screen 16 performed at the center point of the screen 16 by using the MEMS mirror 13. The scan control unit 15 having the reference point and reference scan width determined in this manner equalizes the scan width of laser beam scan in the horizontal direction h performed at other points in the vertical direction v of the screen 16.

As illustrated in FIG. 2, the distance between the reflection surface 13a of the MEMS mirror 13 and the screen 16 along the optical path of the laser beam is L, the optical deflection angle of the MEMS mirror 13 (angle formed by received laser beam and released laser beam) is θ, and the optical deflection angle of the galvano-mirror 14 is φ. FIG. 2 does not show the components of the MEMS mirror 13 and galvano mirror 14, and only illustrates lines corresponding to the optical axes of the laser beams from the reflection surface 13a of the MEMS mirror 13 to the screen 16.

Under the condition shown in FIG. 2, a distance $L_\phi$ between the reflection surface 13a of the MEMS mirror 13 and the screen 16 when the optical deflection angle θ of the MEMS mirror 13 is zero degree is expressed as an equation (1) shown below:

$$L_\phi = L/\cos\phi \quad (1)$$

A scan width $W_\phi$ on the screen 16 is expressed as an equation (2) shown below when the maximum of the optical deflection angle θ of the MEMS mirror 13 is $\theta_{max}$:

$$W_\phi = L_\phi \tan\theta_{max} = (L/\cos\phi) \times \tan\theta_{max} \quad (2)$$

From the equation (2), the scan width $W_\phi$ becomes minimum when the optical deflection angle φ of the galvano-mirror 14 is zero degree. In this case, a scanning width $W_O$ is expressed as an equation (3) shown below:

$$W_O = (L/\cos 0) \times \tan\theta_{max} = L \tan\theta_{max} \quad (3)$$

Thus, a ratio R of the scan width $W_\phi$ to the scan width $W_O$ is expressed as an equation (4) shown below:

$$R = W_O/W_\phi$$
$$= L\tan\theta_{max} / ((L/\cos\phi) \times \tan\theta_{max}) = \cos\phi \quad (4)$$

Based on these equations, the scan control unit 15 controls voltage supplied to the MEMS mirror 13 such that the scan amplitude in the horizontal direction h of the screen 16 becomes cos φ times larger according to the optical deflection angle φ of the galvano-mirror 14. By this method, the scan width of laser beam scan in the horizontal direction h performed at each point in the vertical direction v of the screen 16 can be equalized with the scan width $W_O$.

In this case, the rotation amplitude of the MEMS mirror 13 decreases as the distance from the center point to above and below in the vertical direction v of the screen 16 increases under the control of the scan control unit 15. Thus, the scan width in the horizontal direction h performed at each point of the screen 16 in the vertical direction v can be equalized. Since the scan width in the horizontal direction h performed at each point in the vertical direction v is equal, the necessity for changing the turn-on timing of the laser beams in the respective colors emitted from the light source 11 for each point in the vertical direction v is eliminated.

When the scan width $W_\phi$ in the horizontal direction h performed at each point of the screen 16 in the vertical direction v is equal to the scan width $W_O$ in the horizontal direction h performed at the center point of the screen 16, the scan width in the horizontal direction h performed at each point in the vertical direction v can be securely equalized even in such a case where the rotation amplitude of the MEMS mirror 13 is the maximum at the time of laser beam scan in the horizontal direction h performed at the center point of the screen 16.

It is assumed herein that the optical deflection angle θ of the MEMS mirror 13 is proportional to voltage supplied to the MEMS mirror 13. When voltage supplied to the MEMS mirror 13 is V under the condition where the optical deflection angle φ of the galvano-mirror 14 is zero degree, the scan control unit 15 supplies voltage V×cos φ to the MEMS mirror 13 by using the optical deflection angle φ of the galvano-mirror 14. In this case, voltage supplied to the MEMS mirror 13 from the scan control unit 15 varies with time for each frame in the manner shown in FIG. 3, for example. A period P in FIG. 3 indicates return time. Thus, the scan width of the laser beam scan in the horizontal direction h at each position in the vertical direction v of the screen 16 can be equalized.

According to the scan-type image display device 1 in this embodiment, the scan width in the horizontal direction h performed at each point in the vertical direction v of the screen 16 is equalized. Thus, the scan area produced by the MEMS mirror 13 and the galvano-mirror 14 can be converted into an appropriate rectangular shape by using a simple structure without requiring complicated optical system or turn-on timing control circuit. Since the necessity for changing the turn-on timing of the laser beam used in the scan in the horizontal direction h for each point in the vertical direction v is eliminated, the light utilization efficiency becomes higher than that in the structure containing the turn-on timing control.

When the scan width in the horizontal direction h performed at each point in the vertical direction v is equalized with the scan width in the horizontal direction h performed at the center point of the screen 16, the scan width can be more easily controlled by utilizing the maximum scanning capability of the MEMS mirror 13.

Second Embodiment

Figure 4:
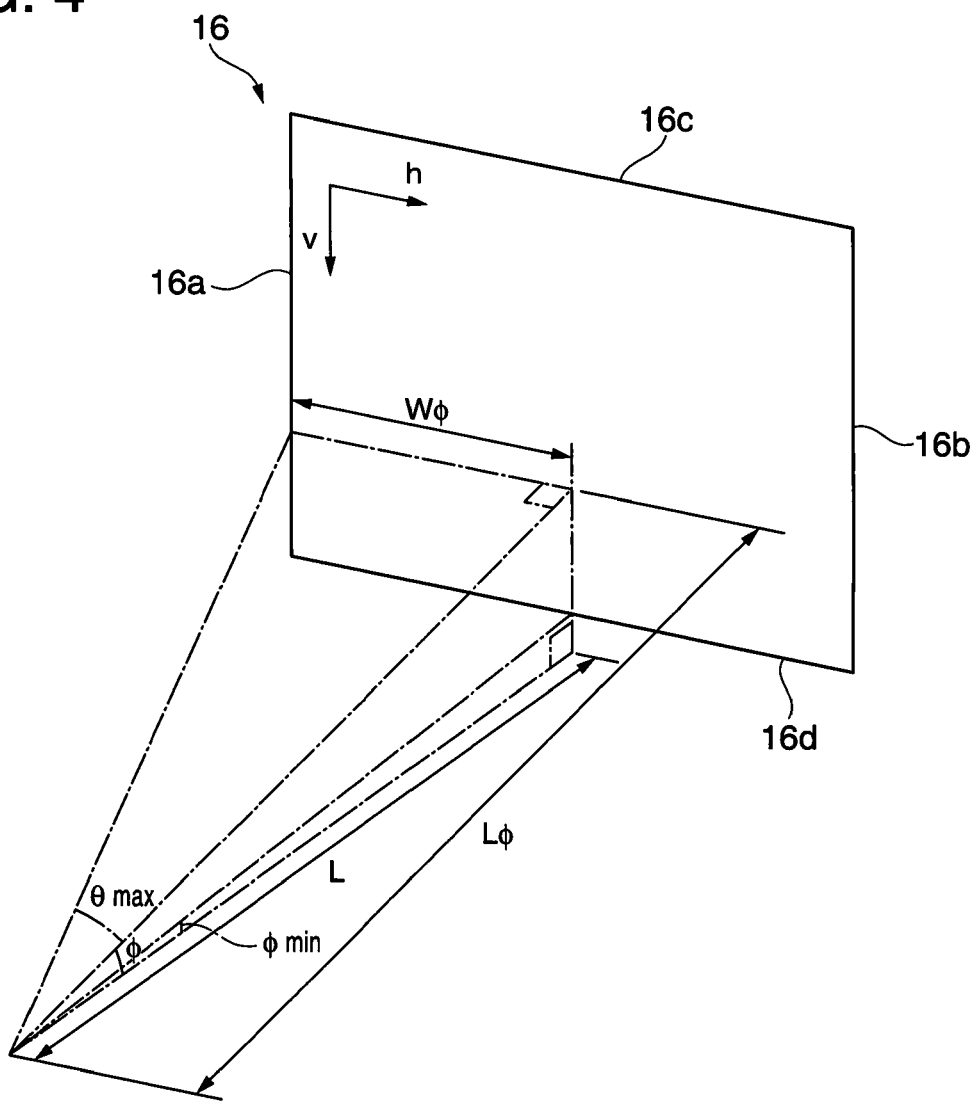
FIG. 4 illustrates a method for controlling scan width according to a second embodiment.
Figure 5:
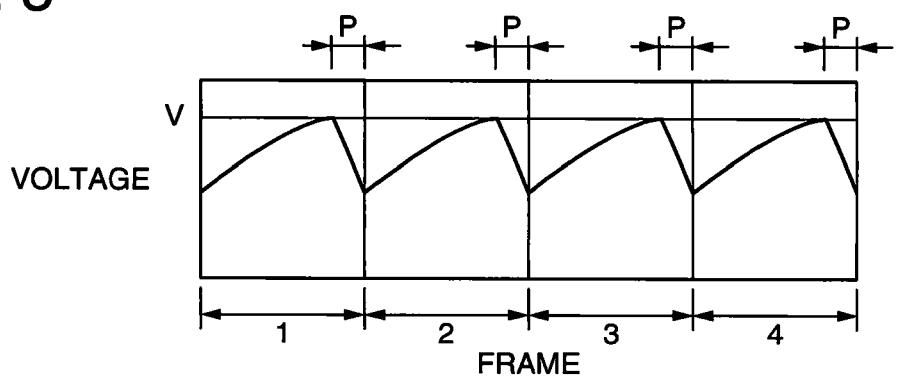
FIG. 5 is a graph showing variations in voltage supplied to an MEMS mirror.

A scan-type image display device according to a second embodiment of the invention is now described with reference to the drawings. The control method performed by a scan control unit in the second embodiment is different from that in the first embodiment, and the control method in this embodiment is thus chiefly explained herein. Similar reference numbers are given to components and elements similar to those in the first embodiment, and the same explanation is not repeated. FIG. 4 illustrates a method for controlling scan width in the horizontal direction of a screen performed by the scan control unit, and FIG. 5 is a graph showing variations in voltage supplied to an MEMS mirror.

While both the elevation angle and depression angle of the scan-type image display device are zero degree in the first embodiment, the image display device in the second embodiment produces a certain elevation degree. More specifically, when the optical deflection angle ϕ of the galvano-mirror 14 is zero degree, the position at which the optical axis of the laser beam released from the galvano-mirror 14 crosses the flat plane containing the screen 16 at right angles is shifted from the center point of the scan area on the screen 16 in the horizontal direction h and vertical direction v produced by the MEMS mirror 13 and the galvano-mirror 14 as illustrated in FIG. 4.

A method for controlling voltage to be supplied to the MEMS mirror 13 by using the scan control unit of the scan-type image display device having this structure is now described.

The distance between the reflection surface 13a of the MEMS mirror 13 and the flat plane containing the screen 16 in the direction corresponding to the normal line orthogonal to the flat plane containing the screen 16 along the optical axis of the laser beam from the reflection surface 13a of the MEMS mirror 13 is L. The optical deflection angle of the MEMS mirror 13 is θ. The optical deflection angle of the galvano-mirror 14 with respect to the normal line discussed above is ϕ. The minimum value of the optical deflection angle ϕ of the galvano-mirror 14 when the angle formed by the normal line and the optical axis of the laser beam released from the galvano-mirror 14 becomes the minimum is $\phi_{min}$.

In this case, the scan width $W_\phi$ on the screen 16 is expressed as the following equation (5) similarly to the above case:

$$W_\phi = (L/\cos \phi) \times \tan \theta_{max} \quad (5)$$

Based on the equation (5), the scan width $W_\phi$ becomes minimum when the optical deflection angle ϕ of the galvano-mirror 14 is $\phi_{min}$. In this case, the scan width $W_{\phi min}$ is expressed as the following equation (6):

$$W_{\phi min} = (L/\cos \phi_{min}) \times \tan \theta_{max} \quad (6)$$

Thus, the ratio R of the scan width $W_\phi$ to the scan width $W_{\phi min}$ is expressed as the following equation (7):

$$R = W_{\phi min} / W_\phi \quad (7)$$
$$= \cos\phi / \cos\phi_{min}$$

Based on the above equations, the scan control unit controls voltage supplied to the MEMS mirror 13 such that the scan amplitude in the horizontal direction h of the screen 16 is $\cos \phi/\cos \phi_{min}$ times larger according to the optical deflection angle ϕ of the galvano-mirror 14. By this method, the scan width of laser beam scan in the horizontal direction h performed at each point in the vertical direction v of the screen 16 can be equalized with the $W_{\phi min}$.

It is assumed therein that the optical deflection angle θ of the MEMS mirror 13 is proportional to the voltage supplied to the MEMS mirror 13 similarly to the above case. In this case, the voltage supplied to the MEMS mirror 13 from the scan control unit varies with time for each frame in the manner shown in FIG. 5, for example.

According to the scan-type image display device having this structure, operation and advantage similar to those in the above embodiment can be offered.

In this embodiment, the position at which the optical axis of the laser beam released from the galvano-mirror 14 crosses the flat plane containing the screen 16 at right angles is disposed out of the scan area produced by the MEMS mirror 13 and the galvano-mirror 14. However, the scan control unit performs similar control even when this position lies within the scan area.

While the elevation angle is produced in this embodiment, the scan control unit performs similar control even when depression angle is produced.

Third Embodiment

Figure 6:
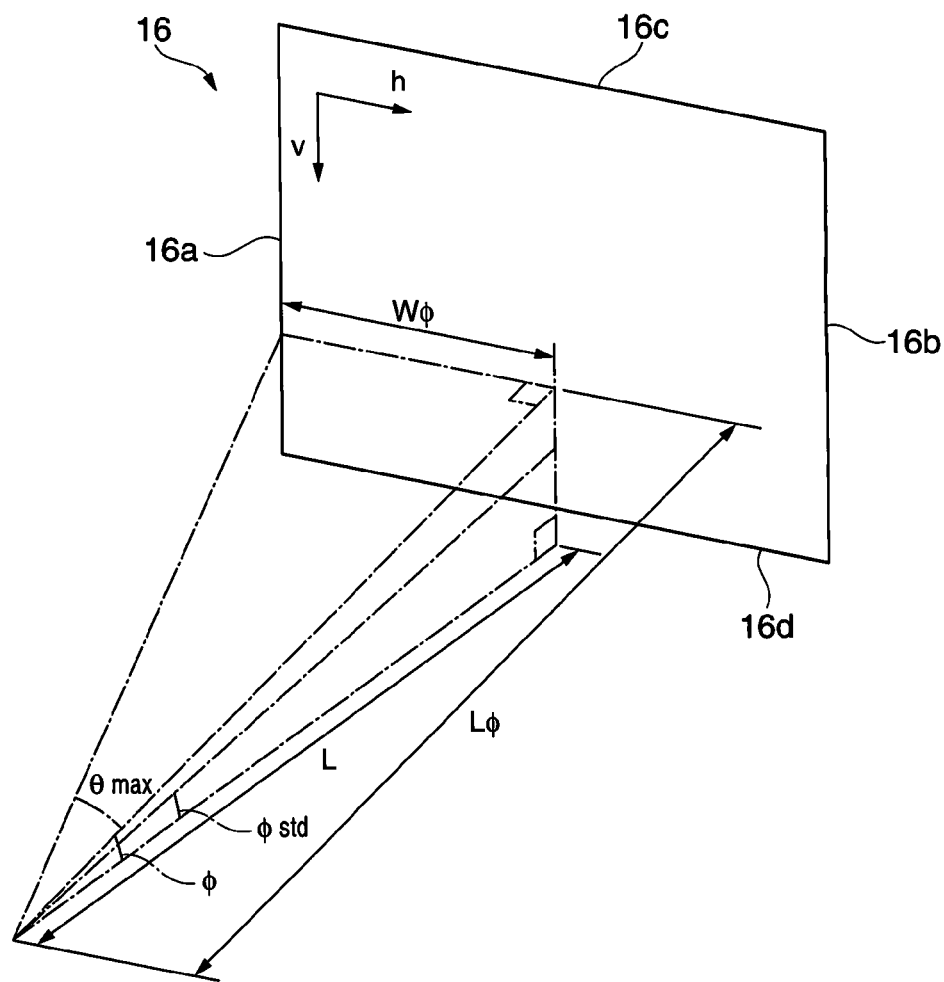
FIG. 6 illustrates a method for controlling scan width according to a third embodiment.
Figure 7:
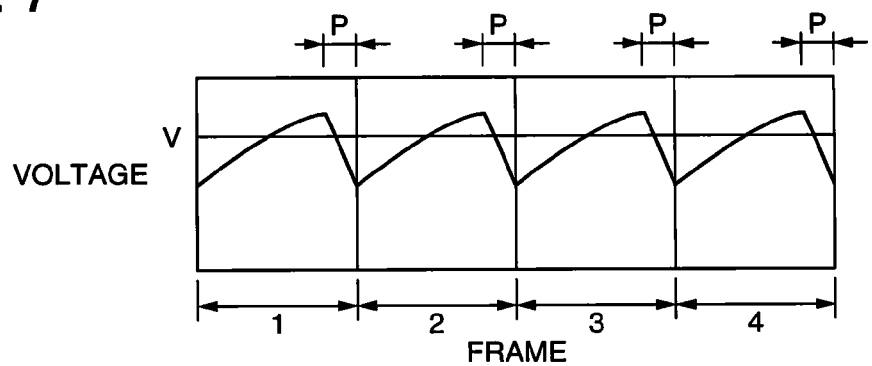
FIG. 7 is a graph showing variations in voltage supplied to an MEMS mirror.

A scan-type image display device according to a third embodiment of the invention is now described with reference to the drawings. The control method performed by a scan control unit in the third embodiment is different from that in the second embodiment, and the control method in this embodiment is thus chiefly explained herein. Similar reference numbers are given to components and elements similar to those in the above embodiments, and the same explanation is not repeated. FIG. 6 illustrates a method for controlling scan width in the horizontal direction of the screen by using a scan control unit, and FIG. 7 is a graph showing variations in voltage to be supplied to the MEMS mirror.

As illustrated in FIG. 6, the scan-type image display device according to this embodiment sets reference scan width at scan width of scan in the horizontal direction h performed when the optical deflection angle ϕ of the galvano-mirror 14 is other than 0 degree and $\phi_{min}$, and equalizes scan width in the horizontal direction h performed at each position in the vertical direction v of the screen 16 with the reference scan width.

More specifically, the scan-type image display device in this embodiment determines reference scan width as scan width of scan performed at a position on the screen 16 other than the center, the upper end side 16c, and the lower end side 16d of the screen 16, and equalizes scan widths performed at other positions on the screen 16 with the reference scan width even when elevation angle or depression angle is produced. Also, the scan-type image display device according to this embodiment equalizes the scan widths performed at other positions on the basis of voltage between the maximum voltage and minimum voltage supplied to the MEMS mirror 13.

A method for controlling voltage to be supplied to the MEMS mirror 13 by using the scan control unit of the scan-type image display device having this structure is now described.

The distance between the reflection surface 13a of the MEMS mirror 13 and the flat plane containing the screen 16 in the direction corresponding to the normal line orthogonal to the flat plane containing the screen 16 along the optical axis of the laser beam from the reflection surface 13a of the MEMS mirror 13 is L. The optical deflection angle of the MEMS mirror 13 is θ. The optical deflection angle of the galvano-mirror 14 with respect to the normal line discussed above is φ. The optical deflection angle φ of the galvano-mirror 14 with respect to the normal line when laser beam is applied to a certain point within the scan area produced by the MEMS mirror 13 and the galvano-mirror 14 is a reference value $\phi_{std}$.

In this case, the scan width $W_\phi$ on the screen 16 is expressed as the following equation (8) similarly to the above case when the optical deflection angle of the MEMS mirror 13 is θ:

$$W_\phi = (L/\cos\phi) \times \tan\theta_{max} \quad (8)$$

Based on the equation (8), the scan width $W_{\phi std}$ when the optical deflection angle of the galvano-mirror 14 φ is $\phi_{std}$ is expressed as the following equation (9):

$$W_{\phi std} = (L/\cos\phi_{std}) \times \tan\theta_{max} \quad (9)$$

Thus, the ratio R of the scan width $W_\phi$ to the scan width $W_{\phi std}$ is expressed as the following equation (10):

$$R = W_{\phi std}/W_\phi$$
$$= \cos\phi/\cos\phi_{std} \quad (10)$$

Based on the above equations, the scan control unit controls voltage supplied to the MEMS mirror 13 such that the scan amplitude in the horizontal direction h of the screen 16 is $\cos\phi/\cos\phi_{std}$ times larger according to the optical deflection angle φ of the galvano-mirror 14. By this method, the scan width of laser beam scan in the horizontal direction h performed at each point in the vertical direction v of the screen 16 can be equalized with the $W_{\phi std}$.

It is assumed therein that the optical deflection angle θ of the MEMS mirror 13 is proportional to the voltage supplied to the MEMS mirror 13 similarly to the above case. In this case, the voltage supplied to the MEMS mirror 13 from the scan control unit varies with time for each frame in the manner shown in FIG. 7, for example.

According to the scan-type image display device having this structure, operation and advantage similar to those in the above embodiments can be offered.

While the elevation angle is produced in this embodiment, the scan control unit performs similar control even when depression angle is produced.

Fourth Embodiment

Figure 8:
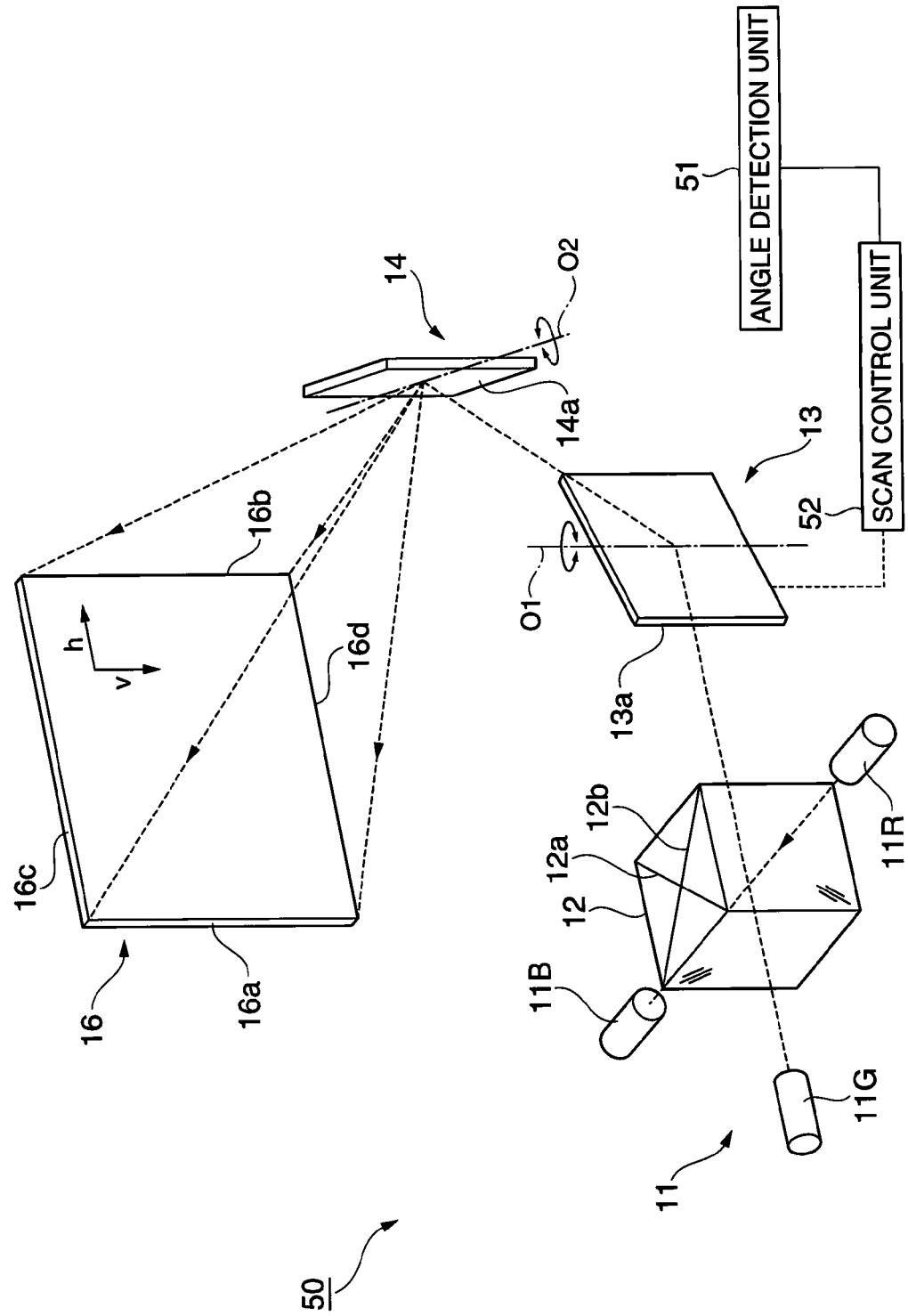
FIG. 8 illustrates a general structure of a scan-type image display device according to a fourth embodiment.

A scan-type image display device according to a fourth embodiment of the invention is now described with reference to the drawings. The control method performed by a scan control unit in the fourth embodiment is different from that in the first embodiment, and the control method in this embodiment is thus chiefly explained herein. Similar reference numbers are given to components and elements similar to those in the first embodiment, and the same explanation is not repeated. FIG. 8 illustrates a general structure of the scan-type image display device in this embodiment.

As illustrated in FIG. 8, a scan-type image display device 50 according to this embodiment includes an angle detection unit 51 for detecting the angle formed by the optical axis of laser beam released from the galvano-mirror 14 and the normal line of the screen 16.

The angle detection unit 51 calculates the elevation angle or depression angle from the angle formed by the optical axis of the laser beam released from the galvano-mirror 14 and the normal line of the screen 16, and outputs the calculated angle to a scan control unit 52. The angle detection unit 51 is constituted by a sensor for detecting inclination of the scan-type image display device 50 to the screen 16, for example. Specific examples of this sensor include a gravity sensor for measuring inclination of the scan-type image display device 50, and a position sensor for detecting the position of the screen using invisible light.

The scan control unit 52 calculates $\phi_{min}$ used in the second embodiment based on the detection result of the elevation angle or depression angle detected by the angle detection unit 51, and controls the scan width in the horizontal direction h of the screen 16.

According to the scan-type image display device 50 having this structure, operation and advantage similar to those in the above embodiments can be offered.

Fifth Embodiment

Figure 9:
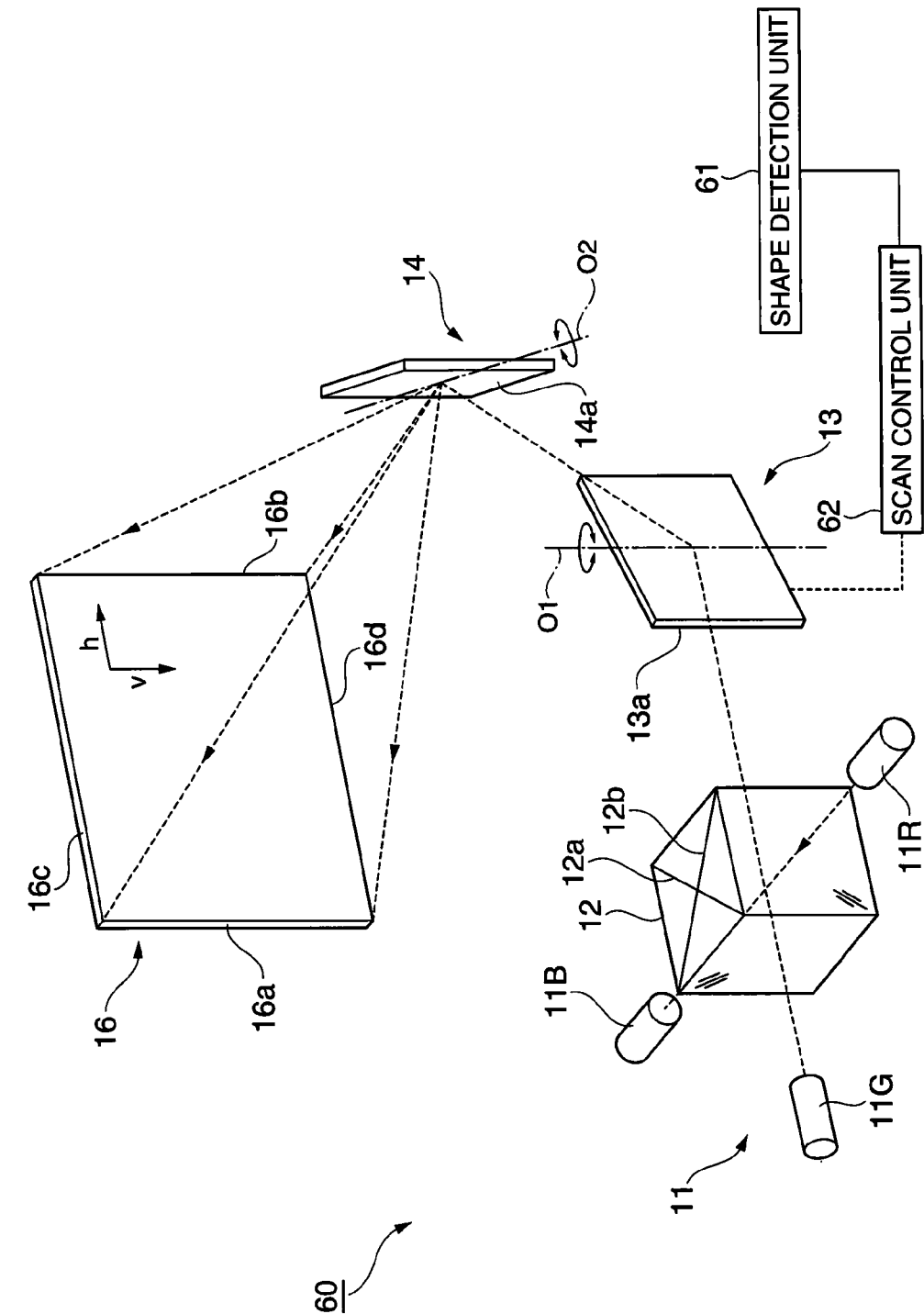
FIG. 9 illustrates a general structure of a scan-type image display device according to a fifth embodiment.

A scan-type image display device according to a fifth embodiment of the invention is now described with reference to the drawings. The control method performed by a scan control unit in the fifth embodiment is different from that in the first embodiment, and the control method in this embodiment is thus chiefly explained herein. Similar reference numbers are given to components and elements similar to those in the first embodiment, and the same explanation is not repeated. FIG. 9 illustrates a general structure of the scan-type image display device in this embodiment.

As illustrated in FIG. 9, a scan-type image display device 60 according to this embodiment includes a shape detection unit 61 for detecting the shape of the scan area produced by the MEMS mirror 13 and the galvano-mirror 14 and displayed on the screen 16.

The shape detecting unit 61 detects the outer shape of the scan area on the screen 16 produced by the MEMS mirror 13 and the galvano-mirror 14, and outputs the detected shape to a scan control unit 62. The shape detection unit 61 contains an image-pickup element such as CCD (charge-coupled device), for example.

The scan control unit 62 appropriately changes voltage to be supplied to the MEMS mirror 13 such that the outershape of the scan area produced by the MEMS mirror 13 and the galvano-mirror 14 becomes a rectangular shape based on the detection result of the outer shape of the scan area detected by the shape detection unit 61. In this case, the scan control unit 62 may calculate $\phi_{min}$ used in the second embodiment based on the detection result of the outer shape of the scan area detected by the shape detection unit 61 and control the scan width in the horizontal direction h of the screen 16.

According to the scan-type image display device 60 having this structure, operation and advantage similar to those in the above embodiments can be offered.

According to this embodiment, it is possible to provide the angle detection unit 51 for calculating the elevation angle or the depression angle from the angle formed by the optical axis of the laser beam released from the galvano-mirror 14 and the normal line of the screen 16 similarly to the structure in the fourth embodiment. In this case, the scan control unit 62 appropriately changes voltage supplied to the MEMS mirror 13 based on the detection results from both the shape detection unit 61 and the angle detection unit 51.

The invention is not limited to the embodiments described and depicted herein, and it is thus intended that various changes and modifications may be made without departing from the scope and spirit of the invention.

While laser beam having passed through the MEMS mirror for horizontal scanning and then through the galvano-mirror for vertical scanning is applied to the screen in these embodiments, laser beam having passed through the galvano-mirror and then through the MEMS mirror may be applied to the screen, for example.

For scanning in the horizontal direction of the screen, other reflection-type optical elements such as galvano-mirror, electro-optical elements such as potassium tantalate niobate (KTN: $Kta_{1-x}Nb_xO_3$) crystal and lithium niobate ($LiNbO_3$) which are crystals using, for example, the Kerr effect (which is the phenomenon that generates birefringence when electric field is applied to an isotropic material and is proportional to the square of the strength of the electric field generated by an applied voltage), acousto-optical elements, and other elements may be used in place of the MEMS mirror.

Similarly, for scanning in the vertical direction of the screen, other reflection-type optical elements such as MEMS mirror and polygon mirror, electro-optical elements such as KTN and lithium niobate, acousto-optical elements, and other elements may be used in place of the galvano-mirror.

It is also possible to provide other optical element such as deflection mirror for deflecting laser beam between the light source and the screen in addition to the MEMS mirror and galvano-mirror.

The entire disclosure of Japanese Patent Application No. 2007-178297, filed Jul. 6, 2007 is expressly incorporated by reference herein.

What is claimed is:

1. A scan-type image display device which displays an image by scan of laser beam emitted from a light source in one direction and another direction of a light receiving surface, comprising:
    a first scan unit which performs scan of the laser beam in the one direction by deflecting the laser beam;
    a second scan unit which performs scan of the laser beam in the another direction by deflecting the laser beam; and
    a scan control unit which equalizes the scan width of the laser beam scan in the one direction by using the first scan unit performed at each position in the another direction within the light receiving surface,
wherein:
    the scan width of the laser beam scan is a width of the laser beam scan received on the light receiving surface; and
    the scan control unit equalizes the scan width of the laser beam scan by adjusting a scan amplitude of the first scan unit at each position in the another direction on the light receiving surface so that the scan width of the laser beam scan at each position in the another direction on the light receiving surface is substantially equal.

2. The scan-type image display device according to claim 1, wherein the scan control unit equalizes the scan width of the laser beam scan in the one direction with the scan width of the laser beam scan in the one direction performed at a predetermined position within the light receiving surface.

3. The scan-type image display device according to claim 1, wherein the scan control unit equalizes the scan width of the laser beam scan in the one direction with the scan width of the laser beam scan in the one direction performed at a position at which the angle formed by the optical axis of the laser beam deflected by the first and second scan units and the normal direction of the light receiving surface becomes the minimum.

4. The scan-type image display device according to claim 1, further comprising:
    an angle detection unit which detects the angle formed by the normal direction of the light receiving surface and the optical axis of the laser beam at the center of the scan area produced by the first and second scan units,
    wherein the scan control unit controls the scan width of the laser beam scan in the one direction based on the detection result detected by the angle detection unit.

5. The scan-type image display device according to claim 1, further comprising:
    a shape detection unit which detects the shape of the scan area on the light receiving surface produced by the first and second scan units,
    wherein the scan control unit controls the scan width of the laser beam scan in the one direction based on the detection result detected by the shape detection unit.

* * * * *